(12) United States Patent
Sun

(10) Patent No.: US 10,974,440 B2
(45) Date of Patent: Apr. 13, 2021

(54) ADAPTION OF MAGNETIC PARTICLES WITHIN A RESIN SUBSTRATE OF A TEXTILE ARTICLE

(71) Applicant: Conrad Sun, New York, NY (US)

(72) Inventor: Conrad Sun, New York, NY (US)

( * ) Notice: Subject to any disclaimer, the term of this patent is extended or adjusted under 35 U.S.C. 154(b) by 593 days.

(21) Appl. No.: 15/675,786

(22) Filed: Aug. 13, 2017

(65) Prior Publication Data

US 2018/0071975 A1    Mar. 15, 2018

Related U.S. Application Data

(60) Provisional application No. 62/374,707, filed on Aug. 12, 2016.

(51) Int. Cl.
*B29C 59/16* (2006.01)
*B32B 5/16* (2006.01)
(Continued)

(52) U.S. Cl.
CPC ............... *B29C 59/16* (2013.01); *A46B 9/00* (2013.01); *A46B 9/02* (2013.01); *B32B 3/00* (2013.01);
(Continued)

(58) Field of Classification Search
CPC ............ B29C 59/16; B29K 2995/0008; B29K 2509/00; B29K 2311/14; B32B 27/30;
(Continued)

(56) References Cited

U.S. PATENT DOCUMENTS 2,368,706 A    2/1945  Harold
5,248,864 A *  9/1993  Kodokian ............... B29C 35/08
                                                    156/272.2

(Continued)

FOREIGN PATENT DOCUMENTS

CN    102806715 A    12/2012
CN    204409691 U     6/2015
WO    2015016221 A1   2/2015

OTHER PUBLICATIONS

Ben Dworski-Riggs, "Magnetic effect on iron powder in resin", May 14, 2015, https://www.youtube.com/watch?v=pxUUTIUOkW0 (Year: 2015).*

(Continued)

*Primary Examiner* — Jacob T Minskey
*Assistant Examiner* — Caroline Montiel
(74) *Attorney, Agent, or Firm* — Han Santos, PLLC; Nabil A. Abdalla

(57) ABSTRACT

The present disclosure describes techniques for fabricating a textile article that incorporates bristle-like filaments that protrude away from a surface plane of the textile article. More specifically, a textile article is fabricated from a laminate formed by curing a reinforcement fiber matrix and a resin substrate. The resin substrate may include magnetic particles the react to a magnetic field introduced during the curing process. Prior to cure, the influence of a magnetic field may cause the magnetic particles within the resin substrate to protrude away from a surface plane of the wet laminate, thus causing the resin substrate itself to form bristle-like filaments. The shape and contour of a design (i.e., arrangement of bristle-like filaments) may be functionally controlled by an arrangement of magnets, and/or magnetic particles used to generate the magnet field that manipulates the resin substrate during the curing process.

15 Claims, 7 Drawing Sheets

(Section A-A)

(51) Int. Cl.
*B32B 3/00* (2006.01)
*B32B 15/18* (2006.01)
*B32B 3/30* (2006.01)
*B32B 25/08* (2006.01)
*A46B 9/02* (2006.01)
*B32B 3/26* (2006.01)
*B32B 15/04* (2006.01)
*B32B 15/082* (2006.01)
*B32B 27/08* (2006.01)
*B32B 27/14* (2006.01)
*B32B 27/12* (2006.01)
*B32B 15/08* (2006.01)
*A46B 9/00* (2006.01)
*B32B 27/30* (2006.01)
*B29K 311/14* (2006.01)
*B29K 509/00* (2006.01)

(52) U.S. Cl.
CPC ............. *B32B 3/26* (2013.01); *B32B 3/30* (2013.01); *B32B 5/16* (2013.01); *B32B 15/04* (2013.01); *B32B 15/08* (2013.01); *B32B 15/082* (2013.01); *B32B 15/18* (2013.01); *B32B 25/08* (2013.01); *B32B 27/08* (2013.01); *B32B 27/12* (2013.01); *B32B 27/14* (2013.01); *B32B 27/30* (2013.01); *B29K 2311/14* (2013.01); *B29K 2509/00* (2013.01); *B29K 2995/0008* (2013.01); *B32B 2260/021* (2013.01); *B32B 2260/025* (2013.01); *B32B 2260/046* (2013.01); *B32B 2260/048* (2013.01); *B32B 2262/0261* (2013.01); *B32B 2262/0276* (2013.01); *B32B 2262/062* (2013.01); *B32B 2262/065* (2013.01); *B32B 2262/08* (2013.01); *B32B 2264/105* (2013.01); *B32B 2307/20* (2013.01); *B32B 2307/546* (2013.01); *B32B 2307/72* (2013.01); *B32B 2437/00* (2013.01); *B32B 2601/00* (2013.01)

(58) Field of Classification Search
CPC ......... B32B 15/08; B32B 27/12; B32B 27/14; B32B 27/08; B32B 15/082; B32B 15/04; B32B 3/26; B32B 5/16; B32B 25/08; B32B 3/30; B32B 15/18; B32B 3/00; B32B 2601/00; B32B 2264/105; B32B 2262/08; B32B 2260/046; B32B 2260/021; B32B 2307/546; B32B 2260/025; B32B 2437/00; B32B 2260/048; B32B 2262/0261; B32B 2262/065; B32B 230/72; B32B 2262/0276; B32B 2262/062; B32B 2307/20; A46B 9/00; A46B 9/02
See application file for complete search history.

(56) References Cited

U.S. PATENT DOCUMENTS

| | | | |
|---|---|---|---|
| 6,111,479 A | 8/2000 | Myohga et al. | |
| 8,389,093 B2 | 3/2013 | Collins | |
| 9,630,337 B2 * | 4/2017 | Peng | D01B 9/00 |
| 2003/0059609 A1 | 3/2003 | Rodgers | |
| 2003/0219279 A1 * | 11/2003 | Nohsho | G03G 15/08 399/159 |
| 2004/0254419 A1 * | 12/2004 | WanG | A61K 45/06 600/8 |
| 2007/0128960 A1 | 6/2007 | Nejhad et al. | |
| 2007/0235046 A1 * | 10/2007 | Gedevanishvili | A24D 3/046 131/200 |
| 2008/0217575 A1 * | 9/2008 | Bachman | C09D 7/65 252/62.54 |
| 2009/0130377 A1 * | 5/2009 | Samanta | C08J 5/045 428/113 |
| 2010/0210745 A1 * | 8/2010 | McDaniel | C09D 5/008 521/55 |
| 2010/0214867 A1 * | 8/2010 | Karkos, Jr. | A47J 43/0465 366/272 |
| 2015/0030811 A1 | 1/2015 | Konishi et al. | |
| 2017/0210160 A1 * | 7/2017 | Li | B42D 25/405 |

OTHER PUBLICATIONS

Love Xo, "Resin Tutorial for Beginners", Sep. 16, 2015, https://www.youtube.com/watch?v=E-vCMHY33Oc (Year: 2015).*
Brainiac75, "Monster magnet meets magnetic fluid", Jan. 27, 2017, https://www.youtube.com/watch?v=L8cCvAITGWM (Year: 2017).*
Resin8 Craft Supplies Ltd, "Using mica powder in resin", May 2, 2016, https://www.youtube.com/watch?v=9oyXfZjHZ5k (Year: 2016).*
Anghel, et al., "Magnetite Nanoparticles for Functionalized Textile Dressing to Prevent Fungal Biofilms Development," Nanoscale Research Letters, vol. 7, No. 1, p. 2, Dec. 2012.
Ficai, et al., "Synthesis of Rod-Like Magnetite by Using Low Magnetic Field," Digest Journal of Nanomaterials and Biostructures, vol. 6, No. 3, p. 945, Jul. 2011.
International Search Report and Written Opinion dated Oct. 18, 2017 for PCT Application No. PCT/US2017/046735, 9 pages.

* cited by examiner (Section A-A)

(Exploded View of Section B-B)

ADAPTION OF MAGNETIC PARTICLES WITHIN A RESIN SUBSTRATE OF A TEXTILE ARTICLE

RELATED APPLICATIONS

This application claim priority to a commonly owned U.S. Provisional Patent Application No. 62/374,707, filed on Aug. 12, 2016, and titled "Adaption of Magnetic Fabric on a Textile Article," which is herein incorporated by reference in its entirety.

BACKGROUND

Present day, modern fashion trends in clothing, upholstery, and textile design tend to gravitate towards adopting different textures on textile articles. Some trends explore smooth velvet-like textures on textile articles, while others prefer to emphasis designs and contours using more pronounced patterns that protrude away from a surface plane of the textile article. By way of example, pronounced patterns may include bristle-like filaments of varying thickness and density. Further, such pronounced patterns may resemble the outer skin layer of animals such as an echidna, a porcupine, or even a lion.

In each instance, the fabrication process of adding texture to a textile article can complicate a fabrication process. Whether the textile article relates to clothing, upholstery, or a product lining, designers and fabrication engineers are often tasked with embroidering or otherwise adding a textured layer to a base layer of a textile article. However, durability and flexibility of such layered garments can be difficult to maintain during normal wear and tear. Further, adding a textured layer to a base layer of a textile article can result in numerous seams for joining together multiple different areas and/or layers, which in turn increases production costs associated with cutting, piecework and sewing, as well as increasing waste. Seams are also prone to failure and can be uncomfortable to, and even change the skin of a wearer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a plan view of the textile article. FIG. 1B illustrates a cross-sectional view through Section A-A of FIG. 1A.

FIG. 2A illustrates a block diagram of components of the resin substrate. FIG. 2B illustrates a block diagram of components of the wet laminate.

FIG. 3A illustrates a plan view of the components of the fabrication process. FIG. 3B illustrates an exploded view through Section B-B of FIG. 3A.

DETAILED DESCRIPTION

Figure 1A:
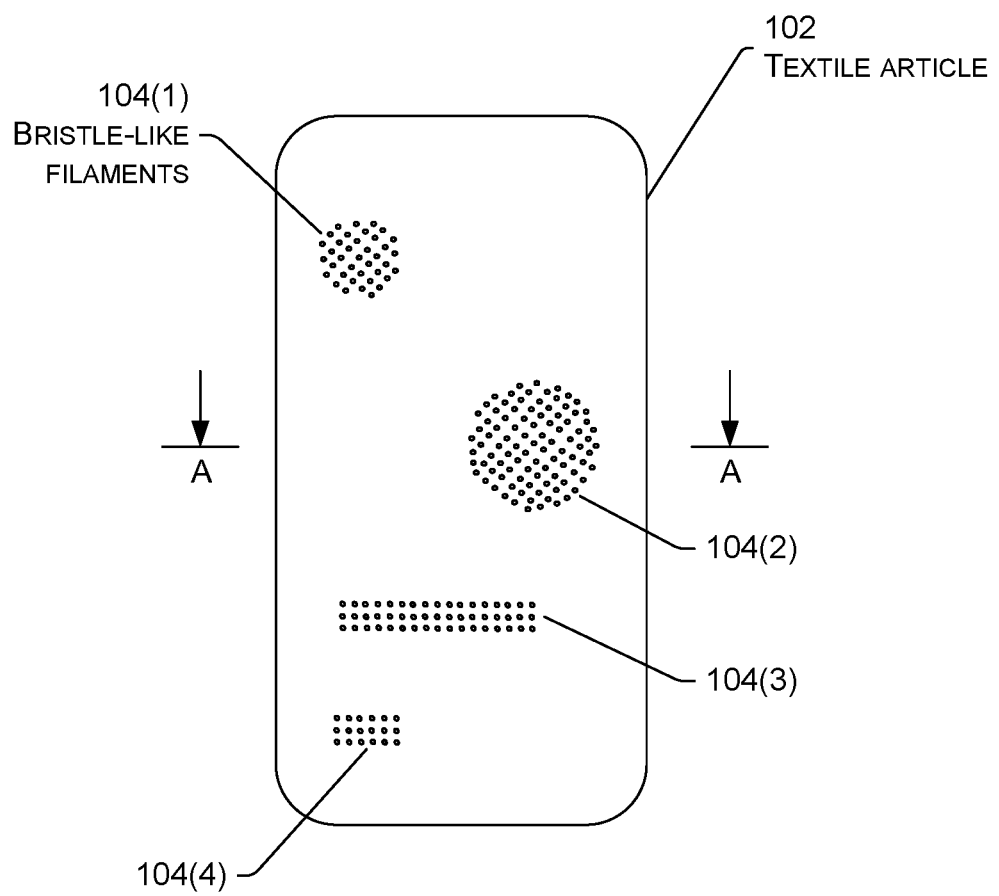
FIGS. 1A and 1B illustrate an example textile article (i.e., laminate) that incorporates bristle-like filaments that protrude away from a surface plane of the textile article.

The present disclosure describes techniques for fabricating a textile article that incorporates bristle-like filaments, formed by ferrofluid effect, that protrude away from a surface plane of the textile article. More specifically, a fabrication process is described that involves fabricating a textile article from a laminate formed by curing a reinforcement fiber matrix and a resin substrate. The resin substrate may include magnetic particles, such as iron oxide $Fe_3O_4$, that react (i.e. repel away) to a magnetic field that is introduced by one or more magnets, during the curing process. Prior to cure, the influence of a magnetic field may cause the magnetic particles within the resin substrate to protrude away from a surface plane of the wet laminate, thus causing the resin substrate itself to form bristle-like filaments. Post cure, the wet laminate may harden to form a rigid laminate (i.e. textile article). The shape and contour of a design (i.e. arrangement of bristle-like filaments) may be functionally controlled by an arrangement of different types of magnets, and/or magnetic particles used to generate the magnet field that manipulates the resin substrate during the curing process.

The term "laminate," as used herein, describes the post-cure material (i.e., textile article) that is formed by the combining the reinforcement fabric matrix and resin substrate. The term "wet laminate" as used herein, describes a fabrication state, prior to cure, whereby a fiber reinforcement matrix is saturated (i.e., wet) within a resin substrate, and resin substrate remains in a liquid state. The wet laminate may undergo a curing process, by which the fiber reinforcement matrix and resin substrate bind together to form a rigid, laminate (i.e., textile article). After the curing process concludes, the cross-section of the laminate (i.e., combined fiber reinforcement matrix and resin substrate) is difficult to elastically manipulate. However, during the curing process itself, while the resin substrate is in a liquid state and is undergoing a transformation to a solid state, the shape and profile of the resin substrate can be manipulated by force. As a result, this disclosure describes techniques that introduce magnetic particles into the resin substrate such that the shape and profile of the resin substrate can manipulated during the curing process, by introducing a magnetic field.

In various examples, the magnetic field may be introduced by positioning one or more magnets substantially near a surface plane of the wet laminate, during the curing process. In doing so, a magnetic field may be generated between the magnets and magnetic particles within the resin substrate. This in turn may cause the bristle-like filaments to form from the resin substrate. The formation of the bristle-like filaments may be confined to surface areas of the wet laminate that are substantially near to the one or more magnets. Stated another way, a designer of a textile article may control the area of a textile article that is imprinted with bristle-like filaments by controlling the shape and placement of one or more magnets substantially near a surface plane of wet laminate during the curing process. The one or more magnets may be of different shapes and sizes to accommodate the shape of the region that is to be imprinted with the bristle-like filaments. The term "substantially near" is intended to describe a positioning of the one or more magnets to directly abut a surface plane of the wet laminate or indirectly (i.e. via an intermediary layer) abut the surface plane of the wet laminate.

Alternatively, a designer of a textile article may control the area of a textile article that is imprinted with bristle-like filaments by controlling regions of the wet laminate that include magnetic particles. In a non-limiting example, the wet laminate may saturate a reinforcement fiber matrix within a first resin substrate or a second resin substrate. The first resin substrate may include magnetic particles that can be influenced by a magnetic field, and the second resin substrate may be without the inclusion of magnetic particles. In this example, the designer of the textile article may identify regions of the reinforcement fiber matrix that are intended to form bristle-like filaments, and saturate those regions within the first resin substrate. Further, the remaining regions of the fiber reinforcement matrix may be saturated within the second resin substrate. In doing so, the resulting wet laminate may be placed over one or more magnets that abut the entire wet laminate. In response, a magnetic field generated by the one or more magnets may cause bristle-like filaments to form over regions of the wet laminate that are saturated within the first substrate, as intended by the designer of the textile article.

In various examples, the size and shape of the bristle-like filaments may be manipulated by one or more factors that include the strength of the magnetic force generated by the one or more magnetics that substantially abut a surface plane of the wet laminate, the viscosity of the resin substrate, and the number of magnetic particles within the resin substrate. In one example, a resin substrate with a low viscosity may form longer bristle-like filaments relative to another resin substrate with a relatively higher viscosity. Additionally, a resin substrate may form thin bristle-like filaments (i.e., relatively small filament cross-section) in comparison to another resin substrate with a relatively higher number of magnetic particles. Referring to the latter, the resin substrate with the higher number of magnetic particles may form thicker bristle-like filaments (i.e., relatively larger filament cross-section) due to the relatively larger portion of resin substrate that is repelled by a magnetic field.

In the illustrated example, the fabrication process for generating a textile article with bristle-like filaments may include generating a wet laminate by saturating a reinforcement fiber matrix within a resin substrate. In the illustrated example, the reinforcement fiber matrix may comprise of a bamboo fiber matrix. Alternatively, the reinforcement fiber matrix may comprise of any type of fabric, including cotton, polyester, nylon, wool, and/or so forth. The selection of the reinforcement fiber matrix may be influenced by the density of the fiber reinforcement matrix (i.e. fiber volume ratio) based on a desired flexibility and stretch of the resulting textile article. For example, a decrease in density of a fiber reinforcement matrix may result in an improvement in the resin substrate penetration.

Additionally, the fabrication process may include a resin substrate (i.e., polymer solution), such as a latex polymer solution, that encapsulates the magnetic particles and cures at room temperature. Alternatively, the resin substrate may comprise of any type of natural rubber, acrylic or silicone-based polymer solution that can properly bond with magnetic particles. The selection of the polymer solution) is based at least in part on an integrity of a bond with magnetic particles, a desired viscosity of the resin substrate, and cure time in a predetermined ambient environment. The integrity of the bond with magnetic particles may ensure that magnetic particles are not ejected from the resin substrate in response to exposure to a magnetic field. The desired viscosity of the resin substrate may impact the desired height and shape of bristle-like filaments formed by a magnetic field reacting with inset magnetic particles. Further, the cure time in a predetermined ambient environment may provide an operator of the fabrication process with sufficient time to overlay a wet laminate onto one or more magnets, and further allow the resin substrate to form the bristle-like filaments before hardening at a conclusion of the cure process. In one example, the cure time for a latex resin substrate that encapsulates the magnetic particles may between 30 minutes to one hour, depending on ambient environmental conditions. Other factors that may affect cure time may include the relative proportion of fiber reinforcement matrix to resin substrate. It is noteworthy that cure time of a resin substrate may be impacted by the ambient room temperature climate. For example, a resin substrate that cures at room temperature in a warm ambient climate may have a relatively shorter cure time relative to the same resin substrate in a colder ambient climate.

Further, the fabrication process may include magnetic particles, such as iron oxide $Fe_3O_4$ particles. The selection of iron oxide $Fe_2O_4$ particles may be based at least in part on the bond integrity of the magnetic particles with most latex-based resin substrates. However, other iron oxide particles, such as $Fe_2O_3$, are possible.

Moreover, the fabrication process may include combining a predetermined ratio of magnetic particles to resin substrate. The predetermined ratio may be influenced by a desired durability, flexibility, and viscosity of the resin substrate. In one example, the predetermined ratio by volume of magnetic particles to resin substrate may be 1:1. Other predetermined ratios are possible. In some examples, a designer may prefer to increase the portion of magnetic particles within the resin substrate in order to influence the size and shape of bristle-like filaments that form as part of the fabrication process. For example, increasing the proportion of magnetic particles to resin substrate may impact the thickness of the bristle-like filaments. Stated another way, a resin substrate with a large proportion of magnetic particles to resin substrate (i.e., greater than a 1:1 ratio) may cause more resin substrate material to be repelled by a magnetic field, resulting in thicker bristle-like filaments, relative to a resin substrate with a lesser proportion of magnetic particles to resin substrate.

However, in some instances, increasing the proportion of magnetic particles relative to resin substrate may adversely impact durability and flexibility of the resulting resin substrate. To counter this deficiency, the resin substrate may be diluted in water to permit the resin substrate to bond with more magnetic powder. By way of example, the ratio of magnetic particles to resin substrate to water, by volume, may be 1:1.5:0.2. However, any predetermined ratio is possible, particularly when considering different particles are resin substrates.

In the illustrated example, the fabrication process may involve overlaying the wet laminate (i.e., reinforcement fiber matrix combined with the resin substrate) onto one or more magnets. In doing so, the magnetic particles within the resin substrate that overlay the one or more magnets may repel away from the one or more magnets. The bond integrity between the magnetic particles and the resin substrate may cause the resin substrate to similarly protrude away from the one or more magnets, thus forming bristle-like filaments in a direction that away from the one or more magnets.

In response to positioning the wet laminate over the one or more magnets, the wet laminate may be left to cure at room temperature for a predetermined cure time. As discussed earlier, the predetermined cure time may be based at least in part on the selection of resin substrate, the proportion of resin substrate relative to fiber reinforcement matrix, and ambient environmental conditions. Following the curing process, the resultant laminate (i.e., textile article) may retain the desired flexibility and strength, along with bristle-like filaments that protrude away from a surface plane the resultant laminate (i.e., textile article), in sections that once overlapped the one or more magnets during the fabrication process.

In various examples, the fabrication process may include one or more permanent magnets, such as iron magnets, neodymium magnets, or boron magnets. The magnetic strength of each permanent magnet may influence at least the height of the bristle-like filaments formed from the resin substrate. For example, a consider a first magnet having a first magnetic strength, and a second magnet having a relatively higher magnetic strength. In this example, the first magnet may generate relatively shorter bristle-like filament within the resin substrate, relative to the second magnet that has a relatively higher magnetic strength. In some examples, the magnetic strength of each permanent magnet may also include the number of bristle-like filaments formed from the resin substrate.

Additionally, the one or more magnets may further include electro-magnets. Similar to permanent magnets, electro-magnets may be selectively positioned to abut sections of the wet laminate to cause bristle-like filaments to form from the resin substrate. In some examples, the magnetic strength of the electro-magnets may impact at least the height of the bristle-like. For instance, the magnetic strength of an electro-magnet is proportional to the electric current associated with the electro-magnet. Stated another way, an increase in electric current to an electro-magnet may proportionally increase the magnetic strength of the magnetic field. In response, an increase in magnetic strength of the magnetic field may cause an increase in height of the bristle-like filaments associated with a portion of the wet laminate that abuts the electro-magnets.

Moreover, the fabrication process may include adjusting the viscosity of the resin substrate and/or adhesive properties of the resin substrate to the reinforcement fiber matrix by adding thinning fluid or a cure retarder to the resin substrate. The thinning fluid or cure retarder may be added, at room temperature, to the resin substrate prior to the curing process, and prior to combining the resin substrate with the reinforcement fiber matrix. By way of example, a thinning fluid or cure retarder may include distilled water, ammonia, acetone, or paint thinner. For example, distilled water or ammonia may be used for a latex-based resin substrate. An example ratio of thinning fluid or cure retarder to resin substrate is 0.1:1.0. However, any ratio is possible. More specifically, the proportion of thinning fluid or cure retarder to resin substrate is functionally based on the desired viscosity and adhesive properties of the resin substrate.

Further, the fabrication process may include adjusting a color of the resin substrate by adding, at room temperature, a colorized pigment to the resin substrate prior to the curing process, and prior to combining the resin substrate with the reinforcement fiber matrix. In one example, the magnetic particles may be pretreated with a neutral color pigment prior to inclusion within the resin substrate. By way of example, iron oxide $Fe_3O_4$ particles generally retain a black pigment. Thus, by the combining iron oxide $Fe_3O_4$ particles with the resin substrate, the pigment of the resulting resin substrate may differ relative to the original pigment of the resin substrate. By way of example, consider combining iron oxide $Fe_3O_4$ particles that have a black pigment with a resin substrate (i.e., latex) that has a white pigment. The resulting resin substrate may adopt a grey tone based on the combination of a black pigmented particles within a white resin substrate.

Additionally, or alternatively, a colorized pigment may be added to the resin substrate at a point in time after the magnetic particles are added to the resin substrate. Doing so ensures that the combination of the resin substrate and magnetic particles does not alter the final pigment of the resin substrate. Instead, the colorized pigment is added to the resin substrate after any change in pigment has already occurred due to the addition of the magnetic particles. The proportion of colorized pigment that is added to the resin substrate may be proportional the intended color tone of the resin substrate.

In various examples, the fabrication process may include placement of an intermediary layer between the one or more magnets and the wet laminate. The intermediary layer may protect the one or more magnets from seeping resin substrate during the curing process, and in doing so, can ensure that wet laminate maintains a uniform, flat, profile at the surface abutting the one or more magnets. By way of example, the intermediary layer may include a vinyl sheet or a plastic sheet. Any material type is possible, provided the material type is non-magnetic, so as to avoid influencing an interaction between the wet laminate and the one or more magnets, and does not adhere to the wet laminate during, or after the curing process.

Therefore, the fabrication process described herein may permit designers to incorporate a design on a textile article that is formed by an arrangement of bristle-like filaments that protrude away from a surface plane of the textile article. As discussed in more detail within this disclosure, the shape and contour of a design may be functionally controlled by an arrangement of magnets, and/or magnetic particles, that are used to generate a magnet field that manipulates the resin substrate of a wet laminate during the curing process.

Figure 1B:
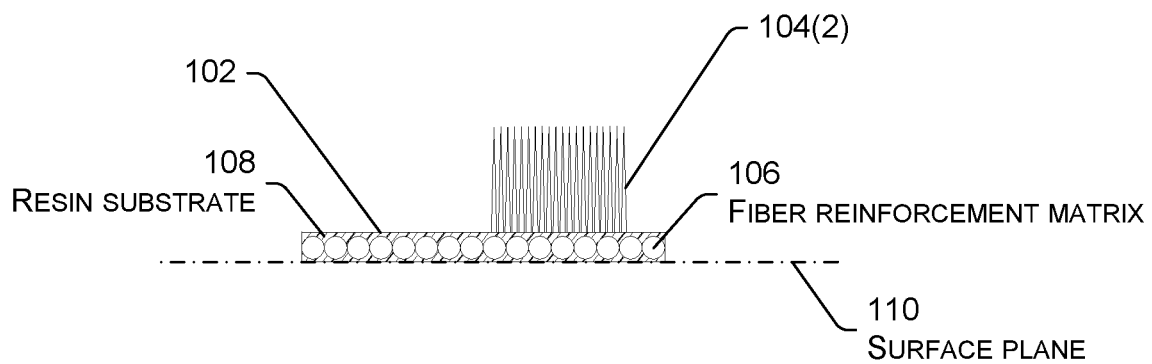

FIGS. 1A and 1B illustrate an example textile article 102 (i.e., laminate) that incorporates bristle-like filament(s) 104 (1)-104(4) that protrude away from a surface plane of the textile article. FIG. 1A illustrates a plan view of the textile article 102. More specifically, the textile article 102 may incorporate multiple regions of bristle-like filament(s) 104 (1)-104(4). The bristle-like filament(s) 104(1)-104(4) protrude away from a surface plane of the textile article 102. While FIG. 1A illustrates four regions of bristle-like filament(s) 104(1)-104(4), any number of regions is possible. Further, it is noteworthy that the textile article 102 may be interchangeably referred to as a "laminate" in a post cured state, or a "wet laminate" in a pre-cured state.

In one example, the bristle-like filament(s) 104(1)-104(4) may form within regions of the laminate (i.e., textile article 102) that substantially abut underlying magnets. In other words, the location of the bristle-like filaments may be controlled by the selectively positioning one or more magnets to abut a surface plane of the laminate (i.e., textile article 102). This in turn allows one of ordinary skill in the art to selectively control the presence, design, and shape of regions of the laminate that incorporate the bristle-like filaments.

It is noteworthy that each region of bristle-like filament(s) 104(1)-104(4) retains a different size and shape. As discussed in more detail with reference to FIGS. 3A and 3B, the size and shape of each region of bristle-like filament(s) 104(1)-104(4) is based at least in part on a magnetic field generated, prior to and/or during the curing process, between magnetic particles within the textile article and one or more magnets that are positioned to substantially abut a surface plane of the textile article (i.e., wet laminate in the pre-cured state).

FIG. 1B illustrates a cross-sectional view through Section A-A of FIG. 1A. More specifically, FIG. 1B illustrates a cross-sectional view of the textile article 102 through one region of bristle-like filament(s) 104(2). The cross-sectional view of the textile article 102 illustrates the fiber reinforcement matrix 106, and resin substrate 108 that is cured at room temperature to form the textile article 102. Further, it is noteworthy, the bristle-like filament(s) 104(2) comprise of the resin substrate 108 that protrudes away from the surface plane 110 of the textile article 102 due to the magnetic field generated, prior to and/or during the curing process, between magnetic particles within the resin substrate 108 and one or more magnets that are positioned to substantially abut a surface plane 110 of the textile article 102. It is noteworthy that the surface plane 110 of the textile article 102 corresponds to the surface plane of magnets that substantially abut the textile article 102.

Figure 2A:
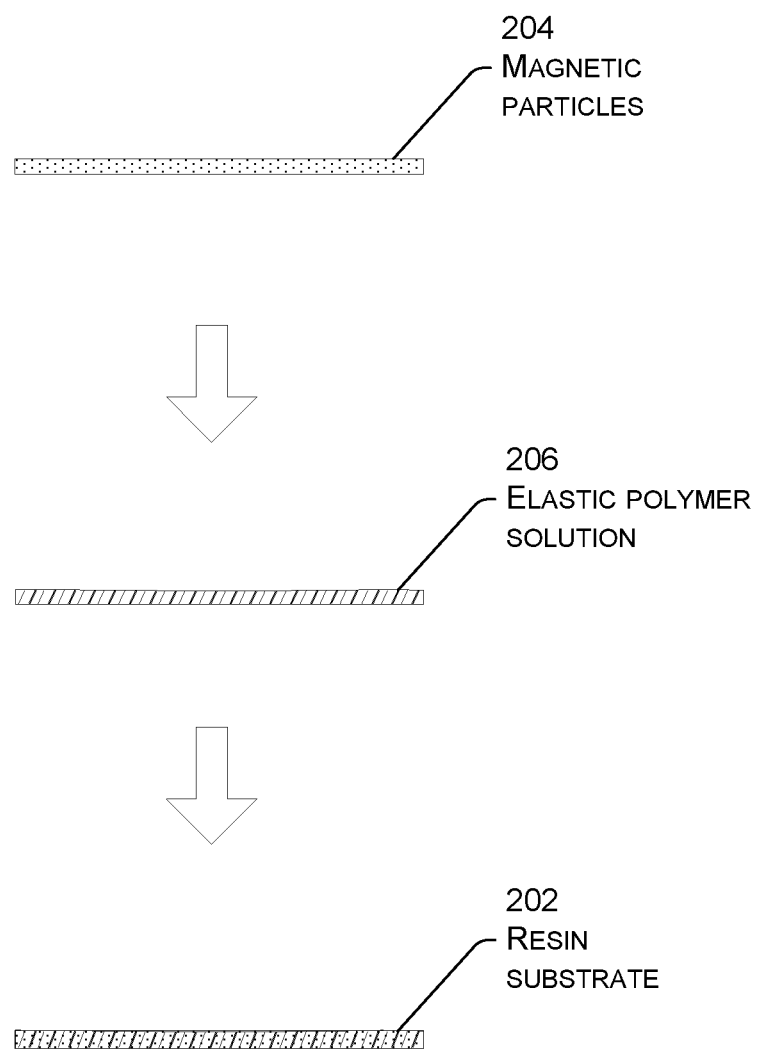
FIGS. 2A and 2B illustrates block diagrams of components of the wet laminate.
Figure 2B:
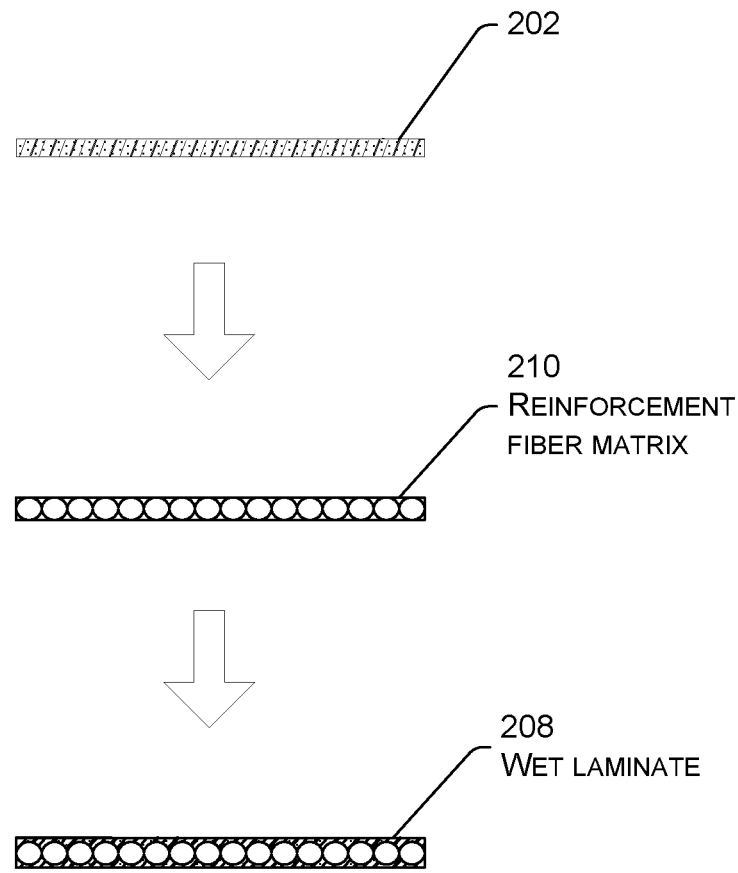

FIGS. 2A and 2B illustrates a block diagrams of components of the wet laminate. FIG. 2A illustrates a block diagram of components of the resin substrate 202. More specifically, the resin substrate 202 is formed by mixing the magnetic particles 204 and the polymer solution 206. The magnetic particles 204 may comprise of iron oxide $Fe_3O_4$. Other iron oxide particles, such as $Fe_2O_3$, are possible. The magnetic particles 204 are introduced to react (i.e., repel away) with a magnetic field that is introduced by one or more magnets, during the curing process. Prior to cure, the influence of a magnetic field may cause the magnetic particles 204 within the resin substrate 202 to protrude away from a surface plane of the wet laminate, thus causing the resin substrate 202 itself to form bristle-like filaments.

The polymer solution 206 may comprise of a latex polymer solution, or any type of natural rubber, acrylic or silicone-based polymer solution that can properly bond with magnetic particles 204. The selection of the polymer solution 206 may be based at least in part on an integrity of a bond with magnetic particles 204, a desired viscosity of the resin substrate 202, and cure time in a predetermined ambient environment. The integrity of the bond with magnetic particles 204 may ensure that magnetic particles 204 are not ejected from the resin substrate 202 in response to exposure to a magnetic field. In other words, if the magnetic particles do not adequately coalesce with the polymer solution, the bristle-like filaments may not form. Instead, the magnetic particles may separate from the resin substrate, leaving only porous holes within the resin substrate. The desired viscosity of the resin substrate 202 may impact the desired height and shape of bristle-like filaments formed by a magnetic field reacting with inset magnetic particles 204. Further, the cure time in a predetermined ambient environment may provide an operator of the fabrication process with sufficient time to overlay a wet laminate onto one or more magnets, and further allow the resin substrate 202 to form the bristle-like filaments before hardening at a conclusion of the cure process.

In one example, the resin substrate 202 may include a thinning fluid or a cure retarder to adjust the viscosity of the resin substrate 202 and/or adhesive properties of the resin substrate 202 to the reinforcement fiber matrix. By way of example, a thinning fluid or cure retarder may include distilled water, ammonia, acetone, or paint thinner. Additionally, or alternatively, the resin substrate 202 may include a colorized pigment to adjust the color of the resin substrate. In some examples, the magnetic particles 204 may be pretreated with a neutral color pigment prior to mixing with the polymer solution 206.

FIG. 2B illustrates a block diagram of components of the wet laminate. More specifically, the fabrication process fabricating a wet laminate 208 by saturating a reinforcement fiber matrix 210 within the resin substrate 202. In one example, the reinforcement fiber matrix 210 may comprise of a bamboo fiber matrix, or any other type of fabric, including cotton, polyester, nylon, wool, and/or so forth. The selection of the reinforcement fiber matrix may be influenced by the density of the fiber reinforcement matrix (i.e., fiber volume ratio) based on a desired flexibility and stretch of the resulting textile article.

Figure 3A:
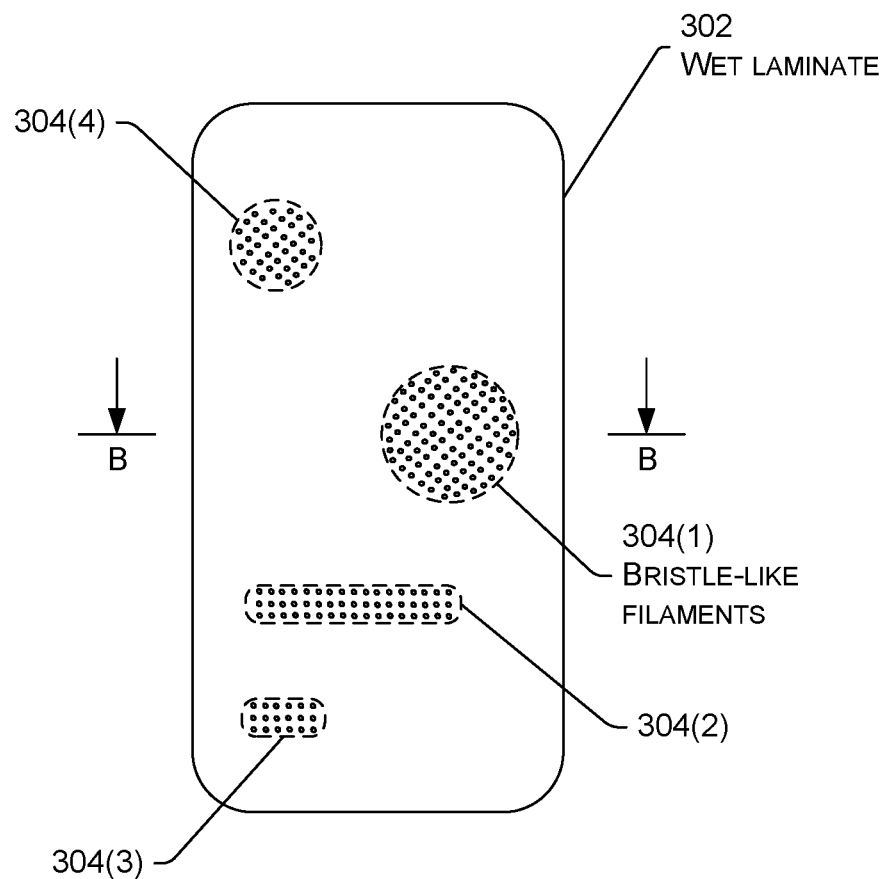
FIGS. 3A and 3B illustrate block diagrams of the fabrication process of a textile article (i.e., laminate) that incorporates bristle-like filaments that protrude away from a surface plane of the textile article.
Figure 3B:
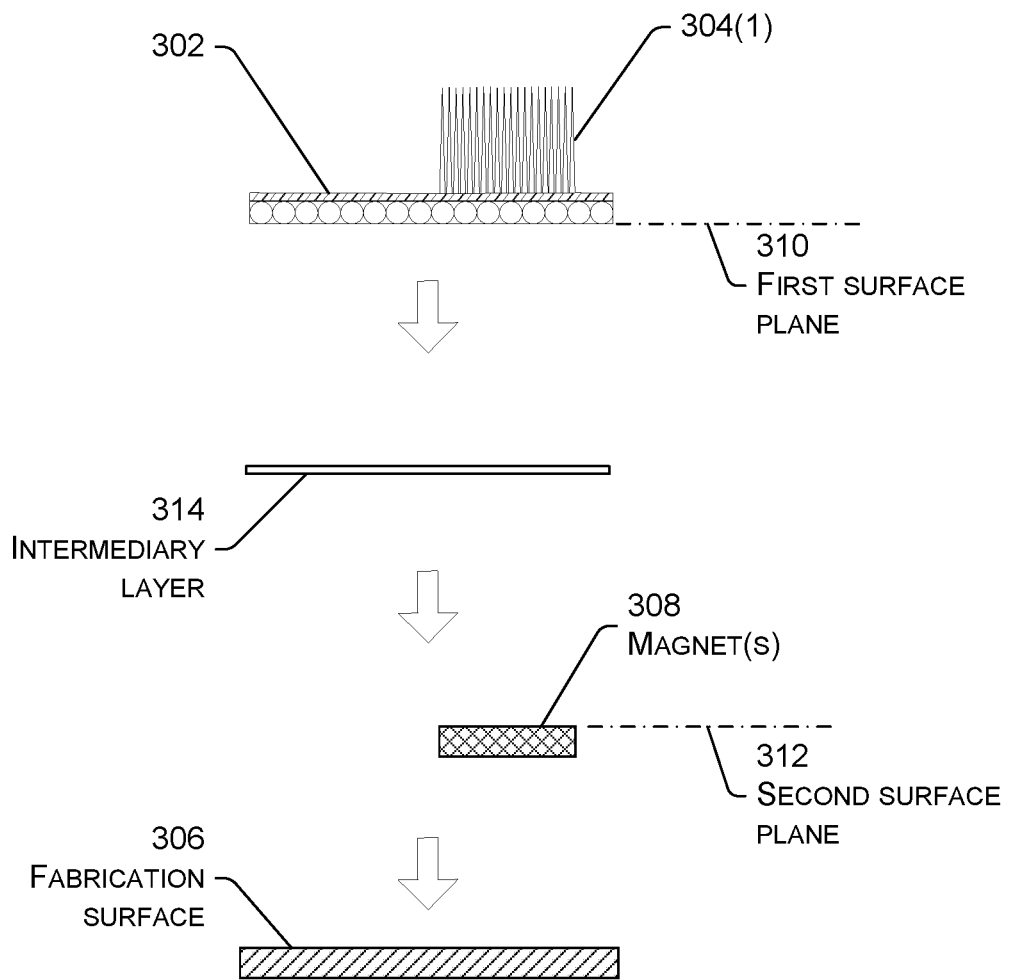

FIGS. 3A and 3B illustrate block diagrams of the fabrication process of a textile article (i.e., wet laminate 302) that incorporates bristle-like filament(s) 304(1)-304(4) that protrude away from a surface plane of the textile article. FIG. 3A illustrates a plan view of the components of the fabrication process. More specifically, FIG. 3A illustrates a wet laminate 302 having four regions of bristle-like filament(s) 304(1)-304(4) that protrude away from a first surface plane 310 of the wet laminate 302. It is noteworthy that even though four region of bristle-like filament(s) 304(1)-304(4) are illustrated in FIG. 3A, any number of regions is possible.

FIG. 3B illustrates an exploded view through Section B-B of FIG. 3A. Particularly, a fabrication surface 306 is shown, upon which one or more magnet(s) 308 may be positioned. In some examples, a design may be imprinted onto a textile article by orienting one or more magnet(s) 308 on the fabrication surface 306 in an arrangement that replicates the intended shape of the design.

The wet laminate 302 may be further positioned to abut the one or more magnet(s) 308 that may cause the resin substrate within the wet laminate 302 to repel away from the abutting surface of the one or more magnet(s), due to the presence of magnetic particles within the resin substrate. In doing so, the resin substrate may form bristle-like filament(s) 304(1)-304(4) to protrude away from a first surface plane 310 of the wet laminate 302. It is noteworthy that the bristle-like filament(s) 304(1)-304(4) protrude in a direction away from the one or more magnet(s) 308, since the one or more magnet(s) 308 are the source of the magnetic force. However, since the wet laminate 302 abuts the one or more magnet(s) 308, the first surface plane 310 of the wet laminate 302 is coplanar to the second surface plane 312 of the one or more magnet(s) 308. Therefore, the bristle-like filament(s) 304(1)-304(4) can be interchangeably described as protruding away from the one or more magnet(s) 308, or protruding away from the first surface plane 310 of the wet laminate 302.

In some examples, an intermediary layer 314 may be placed between the one or more magnet(s) 308 and the wet laminate 302. The intermediary layer 314 may protect the one or more magnet(s) 308 from seeping resin substrate during the curing process, and in doing so, can ensure that wet laminate 302 maintains a uniform, flat, profile at the surface abutting the one or more magnet(s) 308. By way of example, the intermediary layer 314 may include a vinyl sheet or a plastic sheet. Any material type is possible, provided the material type is non-magnetic, so as to avoid influencing an interaction between the wet laminate 302 and the one or more magnet(s) 308, and does not adhere to the wet laminate 302 during, or after the curing process.

Further, it is noteworthy that regions of the wet laminate 302 that do not abut the one or more magnet(s) 308 may retain a uniform laminate thickness, since there are no magnets to repel the magnetic particles within the resin substrate of the wet laminate 302.

Figure 4:
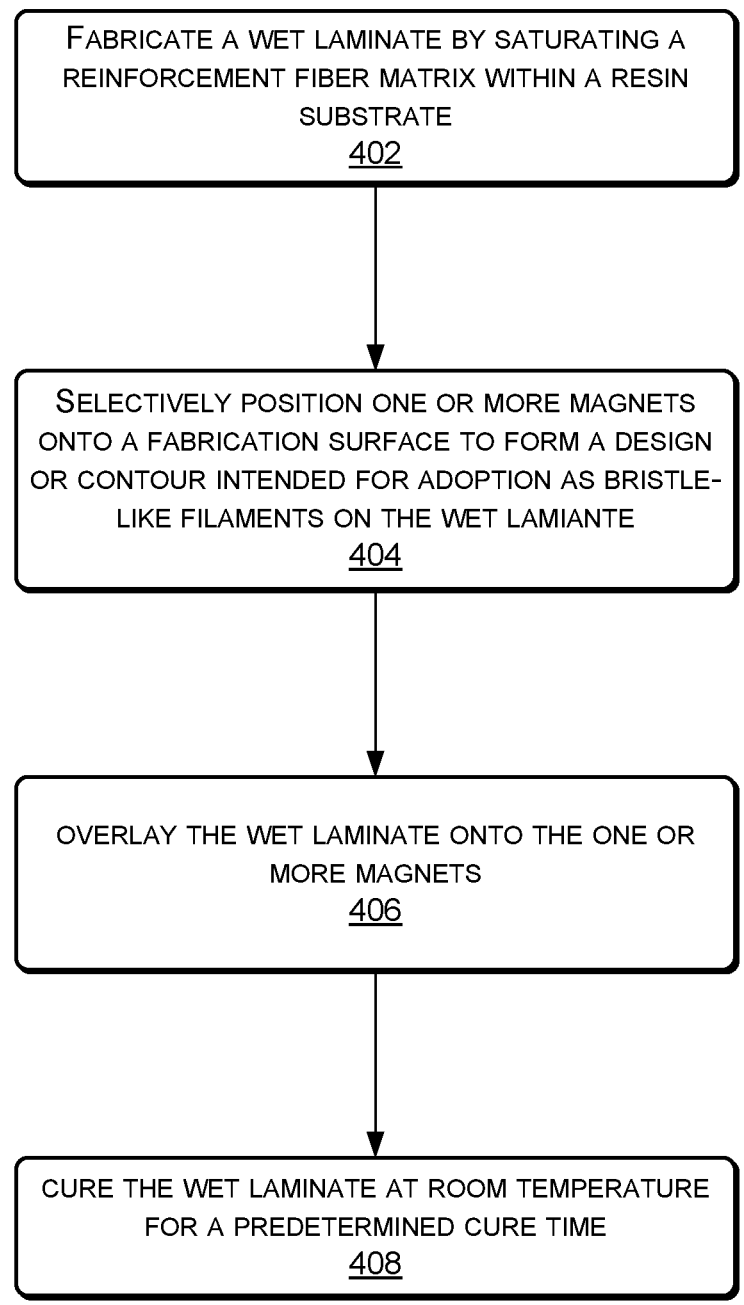
FIG. 4 illustrates a flow diagram of a fabrication process of a textile article (i.e., laminate) that incorporates bristle-like filaments that protrude away from a surface plane of the textile article.

FIG. 4 illustrates a flow diagram of a fabrication process 400 of a textile article (i.e., laminate) that incorporates bristle-like filaments that protrude away from a surface plane of the textile article. The fabrication process 400 illustrates a collection of blocks in a logical flow chart, which represents a sequence of operations that can be implemented as part of the fabrication process. The order in which the operations are described is not intended to be construed as a limitation, and any number of the described blocks can be combined in any order and/or in parallel to implement the process.

At 402, the fabrication process may involve may fabricating a wet laminate by saturating a reinforcement fiber matrix within a resin substrate. The reinforcement fiber matrix may take the form of a weave that is flexible enough to adapt to contours used in clothing design, upholstery, product lining, and/or so forth. By way of example, the reinforcement fiber matrix may be a bamboo matrix. Further, the resin substrate may be a latex-based polymer solution that encapsulated iron oxide $Fe_3O_4$ particles. In some examples, thinning fluids or cure retarders may be added to the resin substrate to adjust the viscosity of the resin substrate and/or adhesive properties of the resin substrate to the reinforcement fiber matrix.

At 404, the fabrication process may involve selectively positioning one or more magnet(s) onto a fabrication surface to form a design or contour intended for adoption as bristle-like filaments on the wet laminate. The one or more magnet(s) may include permanent magnets or electro-magnets. Permanent magnet(s) may include iron magnets, neodymium magnets, or boron magnets. The selection of magnets may be further influenced by the desired magnetic strength to repel the magnetic particles within the resin substrate.

It is noteworthy that the magnetic particles may repel away from the magnets because the magnetic particles and magnets share a common polarity. Alternatively, the magnetic particles may be fabricated from a diamagnetic material that creates an induced magnetic field in a direction opposite to a magnetic field applied by the magnets. In this instance, the diamagnetic particles may be repelled by the applied magnetic field of the magnets.

At 406, the fabrication process may involve overlaying the wet laminate onto the one or more magnets. In doing so, the resin substrate within regions of the wet laminate that abut the one or more magnet(s) may form bristle-like filaments that protrude away from the surface plane of the wet laminate. In some examples, an intermediary layer may be positioned between the wet laminate and the one or more magnets to protect the one or more magnets from seeping resin substrate during the curing process.

At 408, the fabrication process may involve curing the wet laminate at room temperature for a predetermined cure time. In some examples, the predetermined cure time may be based at least in part on the selection of resin substrate, the proportion of resin substrate relative to fiber reinforcement matrix, and ambient environmental conditions.

Example Clauses

Example A, a method of fabricating a textile article with bristle-like filaments protruding away from a surface plane of the textile article, the method comprising: generating a wet laminate by saturating a reinforcement fiber matrix within a resin substrate, the resin substrate comprising a portion of magnetic particles and a portion of polymer solution; positioning one or more magnets on a fabrication surface, the one or more magnets being positioned to form a design or contour that is intended to be imprinted on the wet laminate as the bristle-like filaments protruding away from a surface plane of the wet laminate; overlaying the wet laminate onto an exposed surface of the one or more magnets, wherein overlaying the wet laminate causes the resin substrate to form bristle-like filaments that protrude away from the surface plane of the wet laminate in areas of the wet laminate that overlay the one or more magnets; and curing the wet laminate at room temperature for a predetermined cure time.

Example B, the method of Example A, further comprising: determining a predetermined ratio by volume of magnetic particles and polymer solution, based at least in part on a desired durability, flexibility, and viscosity of the resin substrate; combining the portion of magnetic particles and the portion of polymer solution, based at least in part on the predetermined ratio; and generating the resin substrate by mixing the portion of magnetic particles and the portion of polymer solution at room temperature.

Example C, the method of Example A or B, wherein the portion of magnetic particles is a first portion of magnetic particles, and further comprising: determining a desired height of the bristle-like filaments associated with the textile article; quantifying a second portion of magnetic particles, based at least in part on the desired height of the bristle-like filaments; combining the second portion of magnetic particles and a portion of water, to the first portion of magnetic particles and the portion of polymer solution; and generating the resin substrate by combining the second portion of magnetic particles, the portion of water, the first portion of magnetic particles, and the portion of polymer solution.

Example D, the method of any one of Example A through Example C, wherein the one or more magnets comprise of permanent magnets, the permanent magnets including iron magnets, neodymium magnets, or boron magnets, and further comprising: determining a desired height of the bristle-like filaments associated with the textile article; and selecting the one or more magnets, based at least in part on a corresponding magnetic strength of the one or more magnets, the corresponding magnetic strength influencing the desired height of the bristle-like filaments.

Example E, the method of any one of Example A through C, wherein the one or more magnets comprise of one or more electro-magnets, and further comprising: determining a desired height of the bristle-like filaments associated with the textile article; quantifying a desired magnitude of an electric current associated with the one or more magnets, based at least in part on the desired height of the bristle-like filaments; and adjusting an actual magnitude of the electric current associated with the one or more magnets, based at least in part on the desired magnitude of the electric current, the actual magnitude of the electric current to proportionally adjust a magnetic strength of the one or more magnets.

Example F, the method of any one of Example A through E, wherein generating the resin substrate further comprises: identifying a color pigment for the resin substrate; and combining, at room temperature, a portion of the color pigment to the resin substrate, the portion of the color pigment to be added to the resin substrate following a mixing the portion of magnetic particles and the portion of polymer solution.

Example G, the method of Example F, wherein the color pigment is a first color pigment, and further comprising: pre-treating the magnetic particles with a second color pigment prior to mixing the portion of magnetic particles and the portion of polymer solution, the second color pigment to provide the portion of magnetic particles with a neutral color.

Example H, the method of any one of Example A through Example G, wherein the resin substrate further comprises: determining at least one of a desired resin viscosity of the resin substrate or a desired adhesive property associated with the reinforcement fiber matrix and the resin substrate; quantifying a portion of thinning fluid or cure retarder that is to be added to the resin substrate, based at least in part on the desired resin viscosity or the desired adhesive property; and combining, at room temperature, the portion of thinning fluid or cure retarder to the resin substrate prior to saturating the reinforcement fiber matrix within the resin substrate.

Example I, the method of any one of Example A through Example H, further comprising: positioning, prior to curing the wet laminate at room temperature, an intermediary layer between the wet laminate and the one or more magnets, the intermediary layer being non-magnetic and non-adhesive relative to the wet laminate.

Example J, the method of any one of Example A through Example I, wherein the portion of polymer solution comprises one of an acrylic, silicon or latex-based polymer solution, wherein the portion of magnetic particles comprise of $Fe_3O_4$ iron oxide particles, and wherein the reinforcement fiber matrix comprises of a bamboo matrix, the bamboo matrix being a flexible weave capable to contouring to clothing design.

While Example A through Example J are described with respect to a method, it is understood in the context of this document that the content of Example A through Example J may also be implemented via an assembly and/or a fabrication process.

Example K, an assembly for fabricating a textile article that incorporates bristle-like filaments protruding away from a surface plane of the textile article, the assembly comprising: a fabrication surface that includes an arrangement of one or more magnets positioned on the fabrication surface to overlay a wet laminate; an intermediary layer that directly overlays an exposed surface of the one or more magnets on the fabrication surface, the intermediary layer being fabricated from a material that is non-magnetic and non-adhesive relative to the wet laminate; and a wet laminate that directly overlays the intermediary layer, the wet laminate comprising of a reinforcement fiber matrix that is saturated within a resin substrate, the resin substrate including a portion of magnetic particles and a portion of polymer solution.

Example L, the assembly of Example K, wherein the arrangement of one or more magnets is based at least in part on a design or contour that is intended to be imprinted on the wet laminate as bristle-like filaments protruding away from a surface plane of the wet laminate, the one or more magnets comprising of one of iron magnets, neodymium magnets, boron magnets, or electro-magnets.

Example M, the assembly of Example K, wherein the resin substrate is a first resin substrate and wherein the wet laminate further comprises of a first region and a second region, the first region including the reinforcement fiber matrix being saturated within the first resin substrate, and the second region including the reinforcement fiber matrix being saturated within a second resin substrate, the second resin substrate comprising of the portion of polymer solution without the portion of magnetic particles, and wherein a shape and contour of the first region is based at least in part on a design or contour that is intended to be imprinted on the wet laminate as bristle-like filaments protruding away from a surface plane of the wet laminate.

Example N, the assembly of Example K or Example M, wherein the one or more magnets correspond to one or more electro-magnets, and further comprising: a controller that is associated with the one or more electro-magnets, the controller to adjust an electric current that controls a magnetic strength of the one or more electro-magnets, whereby a height of the bristle-like filaments that protrude away from the surface plane of the wet laminate is based at least in part on the magnetic strength of the one or more electro-magnets that overlay the wet laminate.

Example O, the assembly of any one of Example K through Example N, wherein the resin substrate of the wet laminate further comprises at least one of: a portion of color pigment that is intended to modify an original color pigment of the resin substrate; or a portion of thinning fluid or cure retarder that is intended to modify an original viscosity of the resin substrate or an original adhesive property of the reinforcement fiber matrix and the resin substrate.

While Example K through Example O are described with respect to an assembly, it is understood in the context of this document that the content of Example K through Example O may also be implemented via a method and/or a fabrication process.

Example P, a fabrication process for a textile article having bristle-like filaments protruding away from a surface plane of the textile article, the fabrication process comprising: configuring an arrangement of one or more magnets onto a fabrication surface, the arrangement of one or more magnets to form a design or contour that is intended to be imprinted on a wet laminate as bristle-like filaments protruding away from a surface plane of the wet laminate; placing an intermediary layer onto an exposed surface of the one or more magnets, the intermediary layer comprising of a vinyl sheet or a plastic sheet; overlaying the wet laminate onto an exposed surface of the intermediary layer, the wet laminate comprising of a reinforcement fiber matrix and a resin substrate that includes a portion of magnetic particles, and wherein, overlaying the wet laminate causes the resin substrate to form bristle-like filaments that protrude away from the surface plan of the wet laminate in areas of the wet laminate that overlay the one or more magnets; and curing the wet laminate for a predetermined cure time at room temperature to form the textile article.

Example Q, the fabrication process of Example P, further comprising: generating the wet laminate by saturating the reinforcement fiber matrix within the resin substrate, the resin substrate comprising a predetermined ratio by volume of magnetic particles and an polymer solution, wherein the predetermined ratio by volume is based at least in part on a desired height or a desired population of the bristle-like filaments that protrude away from the surface plane of the textile article.

Example R, the fabrication process of Example Q, wherein the predetermined cure time is based at least in part on an ambient climate associated with the fabrication process, the polymer solution, or the predetermined ratio by volume of reinforcement fiber matrix and resin substrate.

Example S, the fabrication process of any one of Example P through Example R, wherein the one or more magnets comprise of permanent magnets, and further comprising: determining a desired first height of bristle-like filaments and a desired second height of bristle-like filaments that are to protrude away from the surface plane of the textile article, the desired first height of bristle-like filaments being greater than the desired second height of bristle-like filaments; selecting a first subset of magnets, based at least in part on the desired first height of bristle-like filaments, the first subset of magnets having a first magnetic strength that is to cause the resin substrate of the wet laminate to protrude away from the surface plane of the wet laminate by a distance substantially equivalent to the desired first height of bristle-like filaments; selecting a second subset of magnets, based at least in part on the desired second height of bristle-like filaments, the second subset of magnets having a second magnetic strength that is to cause the resin substrate of the wet laminate to protrude away from the surface plane of the wet laminate by a distance substantially equivalent to the desired second height of bristle-like filaments, the second magnetic strength being less than the first magnetic strength, and wherein the one or more magnets include the first subset of magnets and the second subset of magnets.

Example T, the fabrication process of any one Example P through Example R, wherein the one or more magnets comprise of electro-magnets, and further comprising: determining a determining a desired first height of bristle-like filaments and a desired second height of bristle-like filaments that are to protrude away from the surface plane of the textile article, the desired first height of bristle-like filaments being greater than the desired second height of bristle-like filaments; determining a first electric current to associate with a first subset of electro-magnets, based at least in part on the desired first height of bristle-like filaments, the first electric current to configure a first magnetic strength of the first subset of electro-magnets to cause the resin substrate of the wet laminate to protrude away from the surface plane of the wet laminate by a distance substantially equivalent to the desired first height of bristle-like filaments; determining a second electric current to associated with a second subset of electro-magnets, based at least in part on the desired second height of bristle-like filaments, the second electric current to configure a second magnetic strength of the second subset of electro-magnets to cause the resin substrate of the wet laminate to protrude away from the surface plane of the wet laminate by a distance substantially equivalent to the desired second height of bristle-like filaments, the second magnetic strength being less than the first magnetic strength; and applying, via a controller and prior to or during curing of the wet laminate, the first electric current to the first subset of electro-magnets and the second electric current to the second subset of electro-magnets.

While Example P through Example T are described with respect to a fabrication process, it is understood in the context of this document that the content of Example P through Example T may also be implemented via a method and/or an assembly.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A method of fabricating a textile article with bristle-like filaments protruding away from a surface plane of the textile article, the method comprising:

generating a wet laminate by saturating a reinforcement fiber matrix within a resin substrate, the resin substrate comprising a portion of magnetic particles and a portion of polymer solution;

determining a desired height of the bristle-like filaments, wherein the desired height varies throughout the textile article;

selecting a plurality of magnets for positioning on a fabrication surface, individual ones of the plurality of magnets having different magnetic strengths that correspond to the desired height of the bristle-like filaments;

positioning the plurality of magnets on the fabrication surface to form a design or contour that is intended to be imprinted on the wet laminate, wherein positioning of the plurality of magnets is further based at least in part on the desired height of the bristle-like filaments within the design or contour;

overlaying the wet laminate onto an exposed surface of the one or more magnets, wherein overlaying the wet laminate causes the resin substrate to form the bristle-like filaments in areas that overlay the one or more magnets; and curing the wet laminate to form the textile article.

2. The method of claim 1, further comprising:

determining a predetermined ratio by volume of magnetic particles and polymer solution, based at least in part on a desired durability, flexibility, and viscosity of the resin substrate;

combining the portion of magnetic particles and the portion of polymer solution, based at least in part on the predetermined ratio; and generating the resin substrate by mixing the portion of magnetic particles and the portion of polymer solution at room temperature.

3. The method of claim 1, wherein the portion of magnetic particles is a first portion of magnetic particles, and further comprising:

determining a desired height of the bristle-like filaments associated with the textile article;

quantifying a second portion of magnetic particles, based at least in part on the desired height of the bristle-like filaments;

combining the second portion of magnetic particles and a portion of water, to the first portion of magnetic particles and the portion of polymer solution; and generating the resin substrate by combining the second portion of magnetic particles, the portion of water, the first portion of magnetic particles, and the portion of polymer solution.

4. The method of claim 1, wherein the one or more magnets comprise of one or more electro-magnets, and further comprising:

determining a desired height of the bristle-like filaments associated with the textile article;

quantifying a desired magnitude of an electric current associated with the one or more magnets, based at least in part on the desired height of the bristle-like filaments; and adjusting an actual magnitude of the electric current associated with the one or more magnets, based at least in part on the desired magnitude of the electric current, the actual magnitude of the electric current to proportionally adjust a magnetic strength of the one or more magnets.

5. The method of claim 1, wherein generating the resin substrate further comprises:

identifying a color pigment for the resin substrate; and
combining, at room temperature, a portion of the color pigment to the resin substrate, the portion of the color pigment to be added to the resin substrate following mixing the portion of magnetic particles and the portion of polymer solution.

6. The method of claim 5, wherein the color pigment is a first color pigment, and further comprising:
pre-treating the magnetic particles with a second color pigment prior to mixing the portion of magnetic particles and the portion of polymer solution, the second color pigment to provide the portion of magnetic particles with a neutral color.

7. The method of claim 1, wherein the resin substrate further comprises:
determining at least one of a desired resin viscosity of the resin substrate or a desired adhesive property associated with the reinforcement fiber matrix and the resin substrate;
quantifying a portion of thinning fluid or cure retarder that is to be added to the resin substrate, based at least in part on the desired resin viscosity or the desired adhesive property; and
combining, at room temperature, the portion of thinning fluid or cure retarder to the resin substrate prior to saturating the reinforcement fiber matrix within the resin substrate.

8. The method of claim 1, further comprising:
positioning, prior to curing the wet laminate at room temperature, an intermediary layer between the wet laminate and the one or more magnets, the intermediary layer being non-magnetic and non-adhesive relative to the wet laminate.

9. The method of claim 1, wherein the portion of polymer solution comprises one of an acrylic, silicon or latex-based polymer solution, wherein the portion of magnetic particles comprise of Fe3O4 iron oxide particles, and wherein the reinforcement fiber matrix comprises of a bamboo matrix, the bamboo matrix being a flexible weave capable to contouring to clothing design.

10. The method of claim 1, wherein curing the wet laminate occurs at room temperature for a predetermined cure time.

11. A fabrication process for a textile article having bristle-like filaments protruding away from a surface plane of the textile article, the fabrication process comprising:
determining a desired height of the bristle-like filaments, wherein the desired height varies throughout the textile article;
selecting an arrangement of one or more magnets for positioning on a fabrication surface, individual ones of the plurality of magnets having different magnetic strengths that correspond to the desired height of the bristle-like filaments;
configuring the arrangement of the one or more magnets onto the fabrication surface, the arrangement of the one or more magnets to form a design or contour that is intended to be imprinted on a wet laminate as the bristle-like filaments protruding away from a surface plane of the wet laminate;
placing an intermediary layer onto an exposed surface of the one or more magnets, the intermediary layer comprising of a vinyl sheet or a plastic sheet;
overlaying the wet laminate onto an exposed surface of the intermediary layer, the wet laminate comprising of a reinforcement fiber matrix and a resin substrate that includes a portion of magnetic particles, and wherein, overlaying the wet laminate causes the resin substrate to form bristle-like filaments that protrude away from the surface plan of the wet laminate in areas of the wet laminate that overlay the one or more magnets; and
curing the wet laminate for a predetermined cure time at room temperature to form the textile article.

12. The fabrication process of claim 11, further comprising:
generating the wet laminate by saturating the reinforcement fiber matrix within the resin substrate, the resin substrate comprising a predetermined ratio by volume of magnetic particles and an polymer solution, wherein the predetermined ratio by volume is based at least in part on a desired height or a desired population of the bristle-like filaments that protrude away from the surface plane of the textile article.

13. The fabrication process of claim 12, wherein the predetermined cure time is based at least in part on an ambient climate associated with the fabrication process, the polymer solution, or the predetermined ratio by volume of reinforcement fiber matrix and resin substrate.

14. The fabrication process of claim 11, wherein the one or more magnets comprise of permanent magnets, and further comprising:
determining a desired first height of bristle-like filaments and a desired second height of bristle-like filaments that are to protrude away from the surface plane of the textile article, the desired first height of bristle-like filaments being greater than the desired second height of bristle-like filaments;
selecting a first subset of magnets, based at least in part on the desired first height of bristle-like filaments, the first subset of magnets having a first magnetic strength that is to cause the resin substrate of the wet laminate to protrude away from the surface plane of the wet laminate by a distance substantially equivalent to the desired first height of bristle-like filaments;
selecting a second subset of magnets, based at least in part on the desired second height of bristle-like filaments, the second subset of magnets having a second magnetic strength that is to cause the resin substrate of the wet laminate to protrude away from the surface plane of the wet laminate by a distance substantially equivalent to the desired second height of bristle-like filaments, the second magnetic strength being less than the first magnetic strength, and
wherein the one or more magnets include the first subset of magnets and the second subset of magnets.

15. The fabrication process of claim 11, wherein the one or more magnets comprise of electro-magnets, and further comprising:
determining a desired first height of bristle-like filaments and a desired second height of bristle-like filaments that are to protrude away from the surface plane of the textile article, the desired first height of bristle-like filaments being greater than the desired second height of bristle-like filaments;
determining a first electric current to associate with a first subset of electro-magnets, based at least in part on the desired first height of bristle-like filaments, the first electric current to configure a first magnetic strength of the first subset of electro-magnets to cause the resin substrate of the wet laminate to protrude away from the surface plane of the wet laminate by a distance substantially equivalent to the desired first height of bristle-like filaments;

determining a second electric current to associated with a second subset of electro-magnets, based at least in part on the desired second height of bristle-like filaments, the second electric current to configure a second magnetic strength of the second subset of electro-magnets to cause the resin substrate of the wet laminate to protrude away from the surface plane of the wet laminate by a distance substantially equivalent to the desired second height of bristle-like filaments, the second magnetic strength being less than the first magnetic strength; and applying, via a controller and prior to or during curing of the wet laminate, the first electric current to the first subset of electro-magnets and the second electric current to the second subset of electro-magnets.

* * * * *